United States Patent
Fenner et al.

[11] Patent Number: 5,904,870
[45] Date of Patent: May 18, 1999

[54] LASER LENS HEATER

[75] Inventors: Richard G. Fenner, Houston, Tex.; Reece Robert Clark, Redwood City, Calif.

[73] Assignee: Midland Manufacturing Corp., Skokie, Ill.

[21] Appl. No.: 09/078,731

[22] Filed: May 14, 1998

[51] Int. Cl.⁶ ......................................................... H05B 1/00
[52] U.S. Cl. ............................................ 219/201; 219/200
[58] Field of Search .................................... 219/200, 201; 250/559.5, 573

[56] References Cited

U.S. PATENT DOCUMENTS

| | | |
|---|---|---|
| 1,791,254 | 2/1931 | Brockdorff . |
| 2,442,913 | 6/1948 | Abrams et al. . |
| 3,789,192 | 1/1974 | Spindler . |
| 3,846,614 | 11/1974 | Doyle et al. . |
| 4,355,861 | 10/1982 | Sebald . |
| 4,629,862 | 12/1986 | Kitagawa et al. . |
| 4,638,728 | 1/1987 | Elenewski . |
| 4,754,149 | 6/1988 | Wang ........................................ 250/573 |
| 4,760,271 | 7/1988 | Wang ..................................... 250/559.05 |
| 4,764,818 | 8/1988 | Crew ........................................ 386/128 |
| 4,882,772 | 11/1989 | Rist et al. . |
| 4,942,629 | 7/1990 | Stadlmann . |
| 5,194,747 | 3/1993 | Culpepper et al. . |
| 5,343,018 | 8/1994 | Limbach . |
| 5,444,530 | 8/1995 | Wang ........................................ 356/338 |

Primary Examiner—Teresa Walberg
Assistant Examiner—Vinod D Patel
Attorney, Agent, or Firm—Emrich & Dithmar

[57] ABSTRACT

A laser assembly includes a laser source which emits a beam transmitted through optics carried by an insulating window and thence through a pressure window supported in a thermally-insulating mount. A thermally conductive carrier ring contacts the face of the pressure window opposite the laser source and has in its outer face an annular groove receiving plural coils of an electrical resistance heating wire coupled to a current source for heating the pressure window to prevent condensation thereon.

18 Claims, 1 Drawing Sheet

LASER LENS HEATER

BACKGROUND OF THE INVENTION

1. Field of the Invention

The present invention relates to laser assemblies of the type which can be used in optical sensors, measuring devices and the like. The invention relates in particular to laser assemblies with optical windows through which the laser beams are transmitted.

2. Description of the Prior Art

Laser devices are used in a wide variety of applications for sensing and measurement purposes. One common application is in distance measuring applications. For example, U.S. Pat. No. 5,194,747 discloses the use of a laser device in a liquid level gauging system for measuring the distance to the surface of the liquid in a vessel and, thereby, the depth of the liquid. While the system disclosed in that patent utilizes a laser diode, other types of laser assemblies may also be used. In such measurement systems, the laser beam is commonly transmitted through an optical window, such as a pressure window. Such a window may become fogged as a result of condensation of vapors with which it comes in contact in use, thereby impairing the operation of the system.

SUMMARY OF THE INVENTION

It is a general object of the invention to provide an improved laser assembly which avoids the disadvantages of prior assemblies while affording additional structural and operating advantages.

An important feature of the invention is the provision of a laser assembly of the type set forth, which prevents condensation on the exit window of the laser assembly.

In connection with the foregoing feature, a further feature of the invention is the provision of an assembly of the type set forth which provides for heating of the exit window.

In connection with the foregoing features, still another feature of the invention is the provision of a laser assembly of the type set forth which is of simple and economical construction.

Certain ones of these and other features of the invention may be attained by providing in a laser assembly including a laser source for generating a laser beam and a pressure window through which the beam is transmitted, the improvement comprising: an electrical resistance heating element disposed adjacent to the window, and a transmission member providing a thermally conductive path between the heating element and the window.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 4 is a further enlarged sectional view of the portion of the heater support ring designated by the numeral 4 in FIG. 3.

DESCRIPTION OF THE PREFERRED EMBODIMENT

Figure 1:
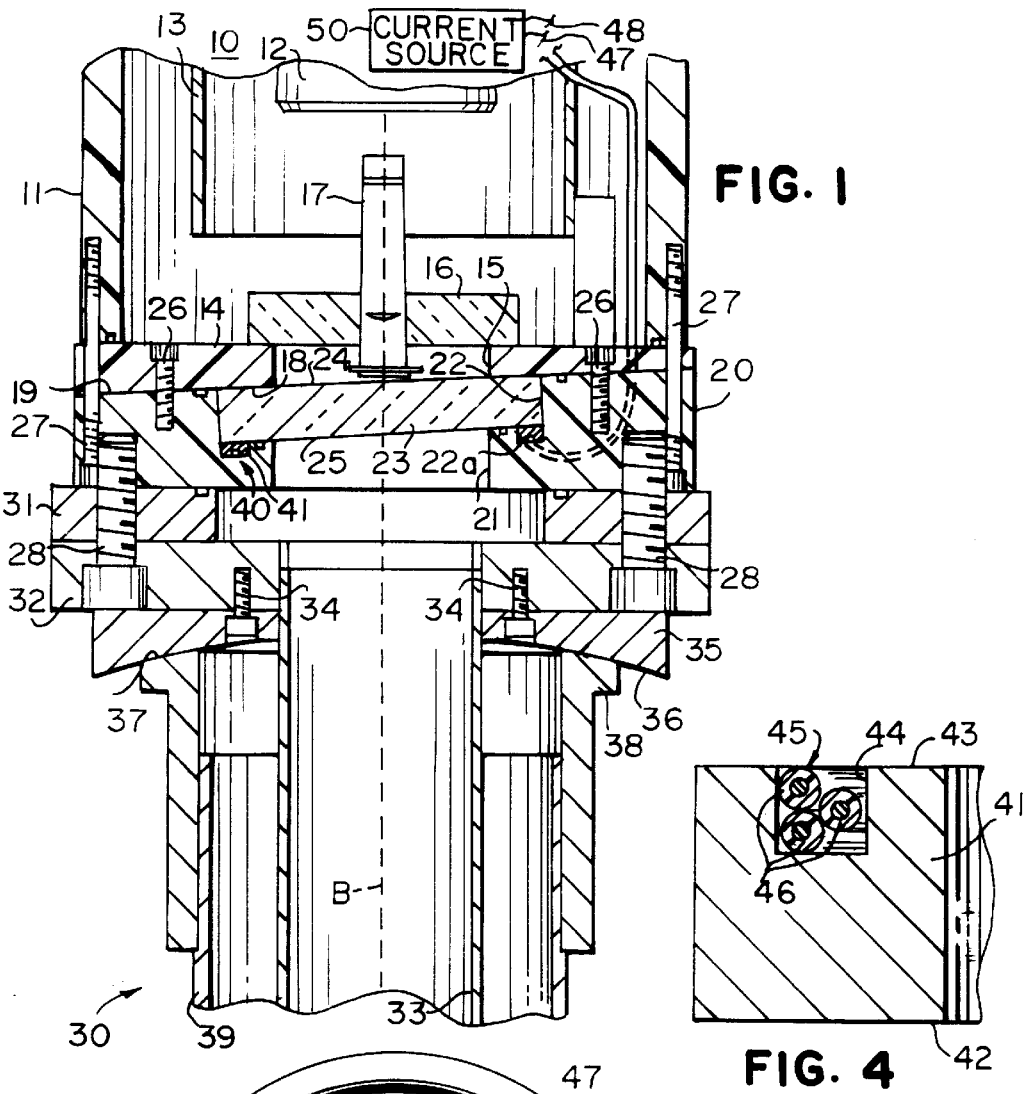
FIG. 1 is a fragmentary sectional view of a laser assembly constructed in accordance with and embodying the features of the present invention.

Referring to FIG. 1, there is illustrated a laser assembly, generally designated by the numeral 10, constructed in accordance with and embodying the features of the present invention. The laser assembly 10 may be of the type for measuring the height of a liquid lading in a tank and includes a housing 11 in which is mounted a laser source 12 surrounded with an insulating sleeve 13. The housing 11 may be generally cylindrical and is closed at its lower end with an upper end plate 14 having a central circular opening 15 therethrough, which is covered with a thermally insulating window 16. The window 16 has a central aperture in which is mounted an optics assembly 17, which may include collimation and achromatic lenses and a diffuser. The laser source 12 emits a laser beam B which is directed through the optics assembly 17.

The upper end plate 14 has an upper surface, which is substantially perpendicular to the axis of the laser beam, and an inclined lower surface 18, which is not perpendicular to the axis of the laser beam and which is disposed in facing contact with an inclined upper surface 19 of a lower end plate 20 which has a central opening 21 therein coaxial with the opening 15. Formed in the upper surface 19 in surrounding relationship with the opening 21 is an annular recess 22, the bottom surface of which is, in turn, provided with a further annular recess 22a. A pressure window 23 is seated in the recess 22 with its upper surface 24 flush with the upper surface 19 of the plate 20, being retained in place by the plate 14. This provides a tilted mounting of the pressure window 23 to minimize stray reflections. The plates 14 and 20 are secured together by screws 26 and this window mount assembly is, in turn, secured to the lower end of the housing 11 by screws 27.

The window mount assembly is also secured by screws 28 to an associated level-adjusting mounting assembly 30, for mounting the laser assembly 10 on an associated tank or other suitable vessel as to which measurements are to be made. More specifically, the level-adjusting mounting assembly 30 includes upper and lower plates 31 and 32 with coaxial central openings therethrough, the lower plate 32 having fixed in its central opening the upper end of a depending guide tube 33. Fixed to the lower plate 32 by screws 34 is an annular tilt plate 35, which has a concave part-spherical lower surface 36 disposed in mating engagement with a convex part-spherical upper surface 37 of a tilt tube 38, which is fixed to the upper end of a support tube 39 mounted on the associated vessel and coaxially surrounding the guide tube 33. Thus, it will be appreciated that the mating part-spherical surfaces 36 and 37 accommodate tilting of the laser assembly 10 with respect to the associated vessel (not shown) to properly align the laser beam perpendicular to the surface of the liquid being measured.

Figure 2:
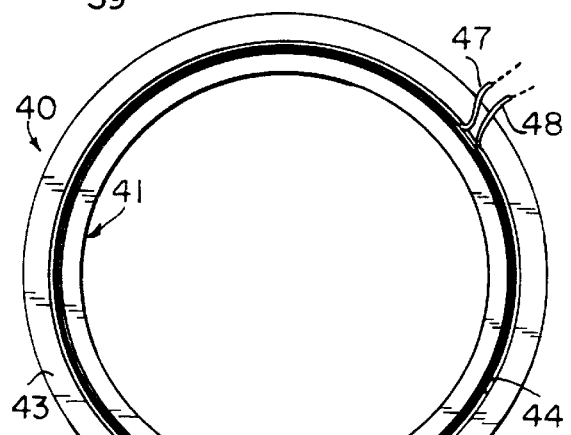
FIG. 2 is a enlarged bottom plan view of the heater ring of the laser assembly of FIG. 1.
Figure 3:
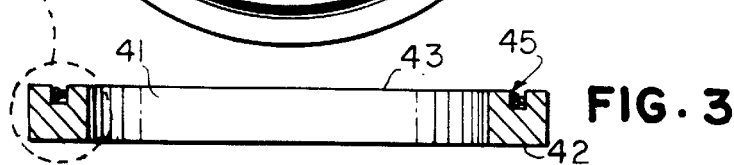
FIG. 3 is a view in vertical section taken along the line 3—3 in FIG. 2.

A fundamental aspect of the present invention is the provision of a heating assembly, generally designated by the numeral 40, for heating the pressure window 23 to prevent the formation of condensation thereon. Referring to FIGS. 2–4, the heating assembly 40 includes an annular heater support ring 41, which is dimensioned to be seated in the recess 22a. The ring 41 has an annular upper surface 42 disposed for contact with the lower surface 25 of the pressure window 23 around its periphery, and an annular lower surface 43 in which is formed an annular groove or recess 44 substantially rectangular in transverse cross section. An electrical resistance heating element 45 is disposed in the recess 44. Preferably, the heating element 45 is in the nature of a length of resistance heating wire, such as insulated Nichrome wire, several coils or convolutions 46 of which are disposed in the recess 44, being retained therein by the bottom surface of the recess 22a. The terminal ends 47 and 48 of the heating element 45 pass out through appropriate passages in the plates 14 and 20, and then upwardly inside the housing 11 for connection to a suitable current source 50 disposed within the housing 11.

The heater support ring 41 is formed of a thermally conductive material, preferably a suitable metal, such as aluminum. In use, the heat generated in the heating element 45 is conducted through the ring 41 to the pressure window 23 for heating it. The housing 11 and the plates 14 and 20 may be formed of thermally insulating materials, preferably a suitable plastic, such as chlorinated PVC. This not only affords light weight and low cost for the laser assembly 10, but also provides thermal insulation to prevent the heat generated by the heating element 45 from being transmitted back to the laser source 12. In a constructional model of the invention, the insulating window 16 is formed of a suitable plastic material, such as acrylic, while the pressure window 23 may be formed of a suitable glass, such as tempered soda lime.

From the foregoing, it can be seen that there has been provided an improved laser assembly with an inexpensive heating assembly for preventing condensation on the pressure window of the assembly.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a laser assembly including a laser source for generating a laser beam and a pressure window through which the beam is transmitted, the improvement comprising:

an electrical resistance heating element disposed adjacent to said window on a side of the window opposite from the laser source, and a transmission member providing a thermally conductive path between said heating element and said window.

2. The laser assembly of claim 1, wherein said heating element includes a plurality of coils of an electrical wire.

3. The laser assembly of claim 1, wherein said heating element is arranged in a loop around the periphery of the window.

4. The laser assembly of claim 1, and further comprising an electrical current source adapted to be coupled to said heating element.

5. The laser assembly of claim 1, and further comprising thermally insulating material disposed between the window and the laser source.

6. The laser assembly of claim 5, wherein said insulating material includes an insulating window.

7. The laser assembly of claim 6, and further comprising a lens assembly carried by said insulating window and transmitting the laser beam to the pressure window.

8. The laser assembly of claim 1, wherein said transmission member is formed of metal.

9. In a laser assembly including a laser source for generating a laser beam and a pressure window through which the beam is transmitted, the improvement comprising:

a thermally conductive member disposed in contact with a side of said window opposite the laser source adjacent to the periphery of the window, and an electrical resistance heating element recessed in said member.

10. The laser assembly of claim 9, wherein said conductive member is formed of metal.

11. The laser assembly of claim 9, wherein said heating element is disposed on a side of said conductive member opposite the pressure window.

12. The laser assembly of claim 9, wherein said conductive member is annular in shape and said heating element forms a loop extending along the entire periphery of said conductive member.

13. The laser assembly of claim 9, wherein said heating element includes a plurality of coils of an electric wire.

14. The laser assembly of claim 9, and further comprising thermally insulating material disposed between the pressure window and the laser source.

15. The laser assembly of claim 14, wherein said insulating material includes a thermally insulating mount supporting the pressure window.

16. The laser assembly of claim 9, wherein the pressure window has opposed parallel surfaces disposed non-perpendicular to the axis of the laser beam.

17. A heated window assembly for a light source comprising:

a pressure window having a first face disposed toward the light source and a second face disposed away from the light source, a thermally conductive transmission member disposed against the second face, and a heating element recessed in said transmission member and spaced from said second face.

18. The window assembly of claim 17 wherein said heating element is disposed on the side of said transmission member opposite said pressure window.

* * * * *